Jan. 28, 1969 H. SEITER ET AL 3,424,955

METHOD FOR EPITAXIAL PRECIPITATION OF SEMICONDUCTOR MATERIAL UPON A SPINEL-TYPE LATTICE SUBSTRATE

Filed March 30, 1966

United States Patent Office 3,424,955
Patented Jan. 28, 1969

3,424,955
METHOD FOR EPITAXIAL PRECIPITATION OF SEMICONDUCTOR MATERIAL UPON A SPINEL-TYPE LATTICE SUBSTRATE

Hartmut Seiter and Christian Zaminer, Munich, Germany, assignors to Siemens Aktiengesellschaft, Munich, Germany Filed Mar. 30, 1966 Ser. No. 539,611
Claims priority, application Germany, Mar. 30, 1965, S 96,266
U.S. Cl. 317—234 16 Claims
Int. Cl. H01l 3/00, 5/00

ABSTRACT OF THE DISCLOSURE

Described is the method of growing monocrystalline layers of semiconductor material crystallizing in the diamond or zinkblende lattice, which comprises epitaxially precipitating said material upon monocrystalline substrates having a spinel-type lattice. Preferred substrates are those from the group consisting of $MgO \cdot Al_2O_3$, $MgO \cdot Cr_2O_3$, $MnO \cdot Fe_2O_3$, $ZnO \cdot Al_2O_3$, $FeO \cdot Al_2O_3$, $MnO \cdot Al_2O_3$, $FeO \cdot Fe_2O_3$, $MgO \cdot Fe_2O_3$.

Our invention relates to a method for epitaxial precipitation of semiconductor material crystallizing in the diamond or zinkblende lattice.

The known epitaxial method leads to an oriented growth of monocrystalline layers on monocrystalline substrates. As the layer-forming material precipitates, for example from the gaseous phase, in atomic constitution, it is subjected to orienting forces effected by the crystalline lattice of the substrate, which accounts for the fact that the precipitate forms a monocrystalline growth in continuation of the crystalline lattice structure of the substrate. In the production of electronic semiconductor components by the known epitaxial methods, the substrate consists of the same monocrystalline semiconductor material as the one being precipitated from the gaseous phase. The necessary orienting forces evolve only from the application of elevated temperatures, which may require heating the substrate up to closely below its melting point. Often this high temperature is also used for dissociating the precipitating material from a suitable gaseous chemical compound. Usually this compound, aside from the elemental substance to be precipitated, contains only an element of the halogen group and/or hydrogen. If the substance to be precipitated is made available in vaporous form, it nevertheless remains necessary to heat the substrate in a suitable manner.

In some cases, relating to the production of electronic semiconductor devices, it has been recognized that the material of the substrate need not be identical with the one being epitaxially grown thereupon. This applies, for example, to the system silicon-germanium of which one material can be caused to grow in monocrystalline constitution on the other, if first the substrate material is precipitated and gradually increasing amounts of the other material are added until eventually only the other material is precipitated. Such methods inevitably result in gradual transitions from one material to the other. For semiconductor purposes, however, this is not always desirable because often extremely thin junctions are needed. Furthermore, the substrate portion of the body resulting from an epitaxial gradual-transition process, often is of little or no appreciable use or value in electrical respects. It would be desirable, therefore, to have the possibility of using a substrate that can be separately and preferably also more cheaply produced than the rather expensive semiconductor monocrystals.

It is an object of our invention to afford such a production of epitaxially grown layers of one material upon a separately produced substrate of another material.

Another object of the invention is to afford a monocrystalline epitaxial precipitation of semiconductor material upon another material while avoiding the abovementioned gradual transition from one to the other.

To achieve these objects, and in accordance with a feature of our invention, we perform the method of epitaxial precipitation of monocrystalline semiconductor material crystallizing in the diamond or zinkblende lattice, by using a monocrystalline substrate having a spinel-type lattice.

Experimental findings and theoretical considerations have led to the result that generally any semiconductor materials which crystallize in the diamond or in the zinkblende lattice can be directly precipitated in monocrystalline constitution upon a sufficiently disturbance-free substrate if the latter crystallizes in accordance with the spinel-type lattice, in which case the epitaxial processing conditions may be the same as with the known methods of epitaxially grown semiconductor material upon a substrate of the same material. The term "sufficiently disturbance-free" is to be understood in the same sense as in the known epitaxial process. Accordingly, a correspondingly prepared face of the spinel single crystal is used for receiving the precipitation and to provide for sufficient thermal and chemical stability.

In view of the importance of silicon epitaxy for semiconductor industrial purposes, the following examples mainly relate to epitaxy of silicon. However, it should be understood that the details mentioned hereinafter, as far as they concern the constitution and treatment of the substrates, are also applicable to germanium epitaxy as well as to the epitaxy of the other semiconductors crystallizing in the diamond or zinkblende lattice, such as is the case with GaAs and some other $A^{III}B^{V}$ compounds, or CdS and some other $A^{II}B^{VI}$ compounds.

Examples of sufficiently temperature and chemically resistant spinels, suitable for the purposes of the invention, are: $MgO \cdot Al_2O_3$, $MgO \cdot Cr_2O_3$ and $MnO \cdot Fe_2O_3$, as well as the aluminum spinels $ZnO \cdot Al_2O_3$, $FeO \cdot Al_2O_3$, $MnO \cdot Al_2O_3$, and the ferrite spinels $FeO \cdot Fe_2O_3$, $MgO \cdot Fe_2O_3$.

The spinel used must be monocrystalline. Spinel monocrystals of the required purity can be produced by the Verneuil method from the corresponding oxides available at corresponding purity. Another way of obtaining the required purity of the spinel is to apply the floating zone melting process. If the particular spinel is nonconductive at high temperatures, a ring-shaped heater consisting preferably of graphite is used to advantage, this heating ring being placed about the crystal in the field of an induction heater coil and being axially displaced along the rod consisting of the sintered oxides. Further applicable for producing monocrystalline spinels in some cases is the process known as hydrothermal method (for example from Appl. Phys. Letters 4 N. 5 of March 1, 1964, pages 89–90).

A typical example of the method according to the invention is as follows. Used is a monocrystalline disc or wafer of $MgO \cdot Al_2O_3$ having a mechanically polished surface (the grain size of the grinding powder ultimately used being $0.25\mu$). The wafer is annealed at about 1200° C. for a prolonged period of time, such as about 2 hours, in a flow of hydrogen for removing the damaged surface layer. This causes a type of gas etching. Prior to annealing in hydrogen, the mechanically polished substrate wafer may also be etched with molten $K_2SO_7$ or borax, which permits reducing the annealing treatment by about 15 to 30 minutes.

The chemical composition of the monocrystalline substrate need not accurately correspond to the stoichiometric formula of the particular spinel. Relative to purity, however, it is in most cases necessary to make certain that undesired doping substances are absent, particularly free elements from groups III and V of the periodic system. This requirement is to be observed particularly with spinels having $Al_2O_3$ as a constituent (although the compound $Al_2O_3$ as such is only little or not at all detrimental). The selection of the precipitation-receiving crystal face (main precipitation face) is from the same viewpoints as for the precipitation upon silicon or germanium. Preferred are epitaxial layers or faces having small Miller's indices. Best suitable as precipitation face of the substrate, therefore, is a 111-face or a 100-face of the spinel.

In other respects, the epitaxial precipitation is effected fundamentally in the same manner as when using a substrate of the same material as the precipitate. The same applies to the apparatus being used so that in this respect the present invention does not require departing from the well known expedients and equipments.

The invention will be further described with reference to the accompanying drawing in which.

Figure 1:
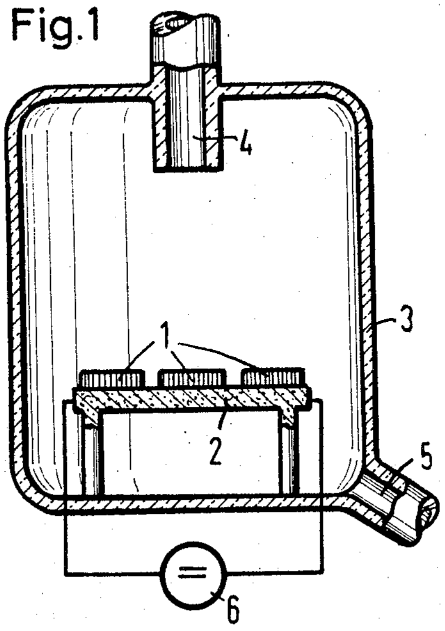
FIG. 1 shows schematically and in vertical section an embodiment of apparatus for performing the method.

Referring to FIG. 1, a number of flat substrate wafers 1 consisting of $Al_2O_3 \cdot MgO$ are placed on top of a heater bridge 2 consisting of carbon coated with SiC. The bridge is mounted in a reaction vessel 3 of quartz and is heated by being directly traversed by electric current. The vessel 3 is provided with an inlet 4 for supplying reaction gas and with an outlet 5 for the spent gases. The heating current for the carbon bridge 2 is taken from a direct current source 6.

It will be understood that the illustration of the process in vessel 3 is schematic only and that the conventional bell-type processing equipment, which more easily permits inserting and removing the semiconductor products, may be used.

When commencing the process, pure hydrogen is passed over the substrates 1, and the current flowing through the carbon heater 2 is so adjusted as to heat the substrates 1 approximately to 1200° C. Upon completion of the hydrogen annealing stage, the supplied hydrogen is substituted by the reaction gas proper. When using, for example, a reaction gas mixture of $SiCl_4$ and $H_2$, it is preferable to adjust the heating current to a substrate temperature of about 1100° C. and to maintain the molar ratio $SiCl_4:H_2$ approximately equal to 0.005. At the locality of the reaction a flow speed of approximately 30 cm./min. and a precipitation rate of about $0.5\mu$/min. is adjusted. Under such conditions, satisfactory monocrystalline layers of silicon and abrupt junctions between the epitaxial coating and the spinel substrate are obtained. The silicon layers are obtainable with or without doping addition depending upon whether or not the reaction gas is given an addition of dopant.

It will be understood that the above-exemplified operating data may be modified in various respects, except that as to surface constitution and pre-treatment of the substrates the above-described requirements should be satisfied as much as feasible.

Effecting the precipitation with the aid of a reaction gas is preferable although not obligatory. Another way is to provide the precipitating material in vapourous form, thus producing the monocrystalline layers by a vaporization process. Furthermore, the epitaxial precipitation may be carried out with the aid of a transport reaction. For this purpose, a temperature gradient is maintained in a suitable active gas to provide for diffusion between the substrate and a source amount of substance which issues to the active gas the material to be precipitated. The material, converted to the gaseous phase at the source material, then precipitates upon the substrates whereas at the source material a regeneration of the gas takes place.

Figure 2:
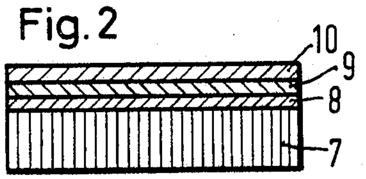
FIG. 2 shows schematically and in section a layer sequence of a semiconductor body made according to the invention.

The semiconductor body according to the invention illustrated in FIG. 2 exhibits the zone sequence npn or pnp. The substrate 7 consists of monocrystalline spinel. The epitaxial layers, successively precipitated upon the substrate, are denoted by 8, 9 and 10. The layers can be further processed in conventional manner, for example by etching the upper layer partly away for the purpose of contacting the lower layers 8, 9 by barrier-free electrodes.

The invention is also advantageously applicable in the production of integrated circuits. The various structures or circuit arrangements required for such purposes can be readily produced in the precipitated semiconductor layers. For example, etching grooves which subdivide the epitaxial layers down to the substrate may serve for electrically separating individual regions of the precipitated semiconductor layers, or for electrically insulating the regions of mutually opposed type of conductance, particularly if such regions, produced by diffusion, would otherwise extend throughout the length or width of the precipitated layer. Furthermore, in directions parallel to the substrate surface, largely different properties can be produced either by the epitaxial process as such, or by subsequent diffusion. Thus, as is often desired, an extremely high-ohmic semiconductor layer may be precipitated and an extremely low low-ohmic layer on top of the first layer, or vice versa.

Figure 3:
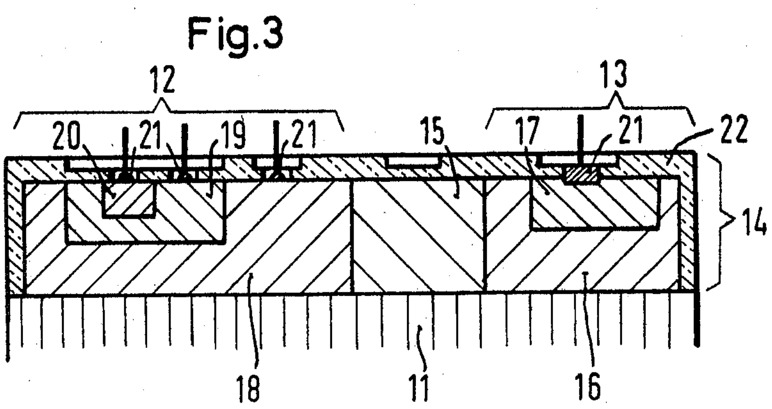
FIG. 3 shows partially and in section an integrated circuit made according to the invention.

An example of a relatively simple integrated circuit made according to the invention is shown in FIG. 3. The substrate 11 of the integrated circuit is constituted by a monocrystalline spinel. This substrate carries a transistor system 12 and a diode system 13, both in a layer 14 of silicon deposited epitaxially. A region 15 of the opposed conductance type isolates the two systems 12 and 13 from each other. By means of diffusion there is produced a trough-shaped region 17 of the opposed conductance type which is located in the diode region of the originally precipitated silicon material 16. This trough-shaped region 17 completes the diode system 13 with the exception of the electrical contact. In the same manner, the transistor portion 18 of the original silicon layer is provided with a region 19 of the opposed conductance type which forms the base zone of the transistor system. An emitter region 20 of the same conductance type as the original (collector) zone 18 of the transistor is diffused into the base region 19. All of the zones are provided with respective barrier-free contact electrodes 21. The remaining semiconductor surfaces are coated with an $SiO_2$ layer 22 which serves as a carrier for current paths (not illustrated) as used conventionally for interconnecting the components of the integrated circuit.

Attempts have been made to produce such or similar structures with the aid of monocrystalline $Al_2O_3$ substrate material. It has been found, however, that products made in this manner are much more susceptible to faults and trouble than products resulting from the method according to the present invention, aside from the fact that the invention also permits using a great variety of different substrate materials having largely different physical and chemical properties, without appreciably impairing the high quality of the epitaxially precipitated layers.

We claim:

1. The method of producing monocrystalline bodies which comprises providing a monocrystalline substrate having a spinel-type lattice, said substrate being selected from the group consisting of $MgO \cdot Al_2O_3$, $MgO \cdot Cr_2O_3$, $MnO \cdot Fe_2O_3$, $ZnO \cdot Al_2O_3$, $FeO \cdot Al_2O_3$, $MnO \cdot Al_2O_3$, $FeO \cdot Fe_2O_3$, $MgO \cdot Fe_2O_3$, and epitaxially depositing an epitaxial layer on said substrate in a crystallographic structure conforming to said substrate.

2. The method of claim 1, wherein the epitaxial layer has a diamond lattice.

3. The method according to claim 2, which comprises polishing a face of a spinel-type monocrystalline wafer prior to precipitating the semiconductor material upon said face.

4. The method according to claim 2, which comprises polishing a face of a spinel-type monocrystalline wafer, and chemically etching the polished face prior to precipitating the semiconductor material upon said face.

5. The method according to claim 2, which comprises polishing a face of a spinel-type monocrystalline wafer consisting of $MgO \cdot Al_2O_3$, and etching the polished face with potassium pyrophosphate or borax prior to precipitating the semiconductor material upon said face.

6. The method according to claim 2, which comprises annealing the spinel-type substrate in a hydrogen flow prior to precipitating the semiconductor material.

7. The method according to claim 2, which comprises precipitating the semiconductor material upon a 111- or 100-face of the spinel-type substrate.

8. The method of claim 1, wherein the epitaxial layer has a zinkblende lattice.

9. The method according to claim 8, which comprises polishing a face of a spinel-type monocrystalline wafer prior to precipitating the semiconductor material upon said face.

10. The method according to claim 8, which comprises polishing a face of a spinel-type monocrystalline wafer, and chemically etching the polished face prior to precipitating the semiconductor material upon said face.

11. The method according to claim 8, which comprises polishing a face of a spinel-type monocrystalline wafer consisting of $MgO \cdot Al_2O_3$, and etching the polished face with potassium pyrophosphate or borax prior to precipitating the semiconductor material upon said face.

12. The method according to claim 8, which comprises annealing the spinel-type substrate in a hydrogen flow prior to precipitating the semiconductor material.

13. The method according to claim 8, which comprises precipitating the semiconductor material upon a 111- or 100-face of the spinel-type substrate.

14. A semiconductor device comprising a monocrystalline body having a monocrystalline substrate with a spinel-type lattice, said substrate being selected from the group consisting of $MgO \cdot Al_2O_3$, $MgO \cdot Cr_2O_3$, $MnO \cdot Fe_2O_3$, $ZnO \cdot Al_2O_3$, $FeO \cdot Al_2O_3$, $MnO \cdot Al_2O_3$, $FeO \cdot Fe_2O_3$, $MgO \cdot Fe_2O_3$, and an epitaxial layer on the substrate in a crystallographic structure conforming to said substrate.

15. The device of claim 14, wherein the epitaxial layer is silicon.

16. The device of claim 15, wherein there is an abrupt junction between the silicon epitaxial layer and the spinel substrate.

References Cited

UNITED STATES PATENTS

| | | | |
|---|---|---|---|
| 2,537,256 | 1/1951 | Brattain | 136—89 |
| 2,840,494 | 6/1958 | Parker | 148—1.5 |
| 3,082,283 | 3/1963 | Anderson | 136—89 |
| 3,210,624 | 10/1965 | Williams | 317—237 |

JAMES D. KALLAM, *Primary Examiner.*

U.S. Cl. X.R.

148—175; 317—237, 238